US00RE45212E

(19) United States
(12) Reissued Patent
Wentink

(10) Patent Number: US RE45,212 E
(45) Date of Reissued Patent: Oct. 28, 2014

(54) EVENT-BASED MULTICHANNEL DIRECT LINK

(75) Inventor: Menzo Wentink, Utrecht (NL)

(73) Assignee: Intellectual Ventures I LLC, Wilmington, DE (US)

(21) Appl. No.: 13/351,588

(22) Filed: Jan. 17, 2012
(Under 37 CFR 1.47)

Related U.S. Patent Documents

Reissue of:
(64) Patent No.: 7,251,235
Issued: Jul. 31, 2007
Appl. No.: 10/880,370
Filed: Jun. 30, 2004

U.S. Applications:
(63) Continuation of application No. 12/460,974, filed on Jul. 27, 2009, now Pat. No. Re. 43,127, which is an application for the reissue of Pat. No. 7,251,235, which is a continuation-in-part of application No. 10/353,391, filed on Jan. 29, 2003, now Pat. No. 6,791,962.

(60) Provisional application No. 60/388,569, filed on Jun. 12, 2002, provisional application No. 60/515,701, filed on Oct. 31, 2003.

(51) Int. Cl.
*H04W 4/00* (2009.01)

(52) U.S. Cl.
USPC ..... 370/338; 370/401; 370/465

(58) Field of Classification Search
USPC ..... 370/328–339
See application file for complete search history.

(56) References Cited

U.S. PATENT DOCUMENTS

| | | | |
|---|---|---|---|
| 5,371,734 | A | 12/1994 | Fischer |
| 5,463,659 | A | 10/1995 | Nealon et al. |
| 5,465,398 | A | 11/1995 | Flammer |
| 5,487,069 | A | 1/1996 | O'Sullivan et al. |
| 5,537,414 | A | 7/1996 | Takiyasu et al. |

(Continued)

FOREIGN PATENT DOCUMENTS

| | | |
|---|---|---|
| DE | 102 28 342 | 9/2003 |
| DE | 10228342 A1 | 9/2003 |

(Continued)

OTHER PUBLICATIONS 802.11 Wireless Networks: The Definitive Guide. O'Reilly & Associates, 2002. pp. 1-14.

(Continued)

*Primary Examiner* — Frank Duong

(57) ABSTRACT

Disclosed herein are exemplary techniques for the communication of information in a wireless system by using multiple wireless channels. A direct link between two or more wireless devices may be established by performing a direct link setup between two or more wireless devices using an access point, where the direct link setup is conducted over a base channel and the direct link is established on a parallel channel. The two or more wireless devices may switch to the parallel channel and use the established direct link to communicate information directly without the access point as an intermediary. In anticipation of a predetermined event, such as the transmission of a delivery traffic indication map (DTIM) beacon frame by the access point, the two or more wireless devices may switch back to the base channel so that uplink, downlink and/or peer-to-peer information may be transmitted and/or received.

20 Claims, 5 Drawing Sheets

(56) References Cited

U.S. PATENT DOCUMENTS

| | | | |
|---|---|---|---|
| 5,636,220 | A | 6/1997 | Vook et al. |
| 5,752,201 | A | 5/1998 | Kivari |
| 5,768,531 | A | 6/1998 | Lin |
| 5,812,968 | A | 9/1998 | Hassan et al. |
| 5,822,682 | A | 10/1998 | Schroderus et al. |
| 5,862,142 | A | 1/1999 | Takiyasu et al. |
| 5,991,287 | A | 11/1999 | Diepstraten et al. |
| 5,995,849 | A | 11/1999 | Williams et al. |
| 5,999,127 | A | 12/1999 | Dezelan |
| 6,047,178 | A | 4/2000 | Frlan |
| 6,052,557 | A | 4/2000 | Kinnunen et al. |
| 6,084,865 | A | 7/2000 | Dent |
| 6,119,014 | A | 9/2000 | Alperovich et al. |
| 6,192,230 | B1 | 2/2001 | Van Bokhorst et al. |
| 6,208,627 | B1 | 3/2001 | Menon et al. |
| 6,222,842 | B1 | 4/2001 | Sasyan et al. |
| 6,292,672 | B1 | 9/2001 | Chavez, Jr. |
| 6,301,609 | B1 | 10/2001 | Aravamudan et al. |
| 6,339,713 | B1 | 1/2002 | Hansson et al. |
| 6,343,083 | B1 | 1/2002 | Mendelson et al. |
| 6,347,095 | B1 | 2/2002 | Tang et al. |
| 6,360,277 | B1 | 3/2002 | Ruckley et al. |
| 6,415,146 | B1 | 7/2002 | Capece |
| 6,424,820 | B1 | 7/2002 | Burdick et al. |
| 6,430,604 | B1 | 8/2002 | Ogle et al. |
| 6,463,290 | B1 | 10/2002 | Stilp et al. |
| 6,470,058 | B1 | 10/2002 | Michalski et al. |
| 6,484,027 | B1 | 11/2002 | Mauney et al. |
| 6,487,180 | B1 | 11/2002 | Borgstahl et al. |
| 6,496,694 | B1 | 12/2002 | Menon et al. |
| 6,507,739 | B1 | 1/2003 | Gross et al. |
| 6,525,690 | B2 | 2/2003 | Rudow et al. |
| 6,529,748 | B1 | 3/2003 | Bruner |
| 6,539,232 | B2 | 3/2003 | Hendrey et al. |
| 6,542,748 | B2 | 4/2003 | Hendrey et al. |
| 6,542,749 | B2 | 4/2003 | Tanaka et al. |
| 6,542,750 | B2 | 4/2003 | Hendrey et al. |
| 6,574,266 | B1 | 6/2003 | Haartsen |
| 6,580,704 | B1 | 6/2003 | Wellig et al. |
| 6,594,666 | B1 | 7/2003 | Biswas et al. |
| 6,618,005 | B2 | 9/2003 | Hannah et al. |
| 6,625,456 | B1 | 9/2003 | Busso et al. |
| 6,631,271 | B1 | 10/2003 | Logan |
| 6,665,520 | B2 | 12/2003 | Romans |
| 6,744,743 | B2 | 6/2004 | Walton et al. |
| 6,759,956 | B2 | 7/2004 | Menard et al. |
| 6,763,240 | B1 | 7/2004 | Chambers et al. |
| 6,778,515 | B2 | 8/2004 | Bolgiano et al. |
| 6,785,251 | B2 | 8/2004 | Bolgiano et al. |
| 6,788,688 | B2 | 9/2004 | Trebes, Jr. |
| 6,791,962 | B2 | 9/2004 | Wentink |
| 6,795,701 | B1 | 9/2004 | Hui et al. |
| 6,799,056 | B2 | 9/2004 | Curley et al. |
| 6,810,246 | B1 | 10/2004 | Kalofonos et al. |
| 6,826,162 | B2 | 11/2004 | Haines et al. |
| 6,842,460 | B1 | 1/2005 | Olkkonen et al. |
| 6,904,055 | B2 | 6/2005 | Pichna et al. |
| 6,925,286 | B1 | 8/2005 | Kraiem et al. |
| 6,968,179 | B1 | 11/2005 | De Vries |
| 6,978,151 | B2 | 12/2005 | Choi et al. |
| 6,985,461 | B2 | 1/2006 | Singh |
| 7,068,615 | B2 | 6/2006 | Niesen |
| 7,095,722 | B1 | 8/2006 | Walke et al. |
| 7,133,909 | B2 | 11/2006 | Bahl |
| 7,212,827 | B1 | 5/2007 | Veschl |
| 7,233,792 | B2 | 6/2007 | Chang |
| 7,245,592 | B2 | 7/2007 | Soomro et al. |
| 7,251,235 | B2 | 7/2007 | Wentink |
| 7,260,392 | B2 | 8/2007 | Kitchin |
| 7,277,692 | B1 | 10/2007 | Jones et al. |
| 7,308,202 | B2 | 12/2007 | Roes et al. |
| 7,359,727 | B2 | 4/2008 | Tsien et al. |
| 7,421,466 | B2 | 9/2008 | Haines |
| 7,450,550 | B2 | 11/2008 | Jin |
| 7,508,799 | B2 | 3/2009 | Sumner et al. |
| 7,545,771 | B2 | 6/2009 | Wentink et al. |
| 2001/0031626 | A1 | 10/2001 | Lindskog et al. |
| 2002/0025839 | A1 | 2/2002 | Usui |
| 2002/0087724 | A1 | 7/2002 | Datta et al. |
| 2002/0159544 | A1 | 10/2002 | Karaoguz |
| 2002/0168040 | A1 | 11/2002 | Coffey |
| 2002/0168993 | A1 | 11/2002 | Choi et al. |
| 2002/0172186 | A1 | 11/2002 | Larsson |
| 2002/0191573 | A1 | 12/2002 | Whitehill et al. |
| 2003/0010524 | A1 | 1/2003 | Connor |
| 2003/0036354 | A1 | 2/2003 | Lee et al. |
| 2003/0063589 | A1 | 4/2003 | Haines et al. |
| 2003/0096576 | A1 | 5/2003 | Salonidis et al. |
| 2003/0126213 | A1 | 7/2003 | Betzler |
| 2003/0140084 | A1 | 7/2003 | 'Angelo |
| 2003/0142641 | A1 | 7/2003 | Sumner et al. |
| 2003/0185241 | A1 | 10/2003 | Lu et al. |
| 2003/0198196 | A1 | 10/2003 | Bahl et al. |
| 2003/0210658 | A1 | 11/2003 | Hernandez et al. |
| 2003/0220765 | A1 | 11/2003 | Overy et al. |
| 2003/0232598 | A1 | 12/2003 | Aljadeff et al. |
| 2004/0044723 | A1 | 3/2004 | Bell et al. |
| 2004/0048609 | A1 | 3/2004 | Kosaka |
| 2004/0056901 | A1 | 3/2004 | March et al. |
| 2004/0077920 | A1 | 4/2004 | Snyder |
| 2004/0078598 | A1 | 4/2004 | Barber et al. |
| 2004/0095907 | A1 | 5/2004 | Agee et al. |
| 2004/0125775 | A1 | 7/2004 | Rios |
| 2004/0125776 | A1 | 7/2004 | Haugli et al. |
| 2004/0127214 | A1 | 7/2004 | Reddy et al. |
| 2004/0147249 | A1 | 7/2004 | Wentink |
| 2004/0184456 | A1 | 9/2004 | Binding et al. |
| 2004/0192413 | A1 | 9/2004 | Frank |
| 2004/0203698 | A1 | 10/2004 | Comp |
| 2004/0236850 | A1 | 11/2004 | Krumm et al. |
| 2004/0242154 | A1 | 12/2004 | Takeda et al. |
| 2004/0246934 | A1 | 12/2004 | Kim |
| 2005/0030976 | A1 | 2/2005 | Wentink |
| 2005/0122927 | A1 | 6/2005 | Wentink |
| 2005/0135305 | A1 | 6/2005 | Wentink |
| 2005/0157674 | A1 | 7/2005 | Wentink |
| 2005/0265305 | A1 | 12/2005 | Furukawa et al. |
| 2006/0148406 | A1 | 7/2006 | Strater et al. |
| 2007/0077894 | A1 | 4/2007 | Zhang et al. |
| 2008/0095126 | A1 | 4/2008 | Mahany et al. |

FOREIGN PATENT DOCUMENTS

| | | |
|---|---|---|
| EP | 1 168 676 | 1/2002 |
| WO | WO-02/49387 | 6/2002 |
| WO | WO-2004/077920 | 9/2004 |
| WO | WO-2005/046134 | 5/2005 |
| WO | WO-2005/067535 | 7/2005 |

OTHER PUBLICATIONS

A. Soomro and S. Choi Philips Research USA, Proposal to Add Link Margin Field in Ieee 802.11h Submission, Sep. 2001, Slides 9-14.

Diepstraten et al., 802.11 Tutorial, IEEE, pp. 1-22, Mar. 1996.

ANSI/IEEE Std. 802.11, Part 11: Wireless LAN Medium Access Control (MAC) and Physical Layer (PHY) Specification, pp. 1-513, 1999.

Communication from the European Patent Office for EP Application 04794757.7, dated Jul. 28, 2009.

Donovan, Jeremy, "Location awareness beyond E911," EE Times, Jun. 9, 2003, 1 page.

ESTRI TR 101 683 V1.1.1, Broadband Radio Access Networks; HIPERLAN Type 2; System Overview, pp. 1-19, 2000.

Final Office Action for U.S. Appl. No. 10/977,469, mailed Aug. 8, 2008.

Final Office Action on U.S. Appl. No. 10/880,366, mailed Sep. 11, 2009.

Final Office Action on U.S. Appl. No. 10/880,370, mailed Nov. 3, 2006.

Final Office Action on U.S. Appl. No. 10/977,470, mailed Jul. 17, 2008.

(56) References Cited

OTHER PUBLICATIONS

Final Office Action on U.S. Appl. No. 10/977,490, mailed Mar. 5, 2012.
Final Office action on U.S. Appl. No. 12/460,974, mailed Jan. 27, 2011.
Ho et al., MediaPlex-An IEEE 802.11 Enhanced Protocol for QoS-Driven Wireless LANS, IEEE pp. 1-25, Nov. 3, 2000.
IEEE Standard 802.11h Amendment 5: Spectrum and transmit power management extensions in the 5 GHz band in Europe, published Oct. 14, 2003, IEEE, 75 pages.
IEEE STD 802.11e/D3.0, Part 11: Wireless Access Control (MAC) and Physical Layer (PHY) Specifications: Medium Access Control (MAC) Enhancements for Quality of Service (QoS), IEEE, 140 pages, 2002.
International Preliminary Report on patentability for PCT/US2004/033487, issued May 1, 2006.
International Preliminary Report on patentability for PCT/US2005/001303, issued Nov. 29, 2006.
International Search Report for PCT/US2004/033487, mailed Feb. 2, 2005.
Kammerman et al, WaveLan-II: A High-Performance Wireless LAN for the Unlicensed Band, Bell Labs Technical Journal, pp. 118-133, 1997.
Kandala et al., "Suggested Changes to Normative Text of WARP," IEEE, pp. 1-11, Jun. 2002.
Kitchen, Duncan, "Wireless Address Resolution Protocol," IEEE 802.11-02/016r0, Jan. 14, 2002, pp. 1-13.
Ni et al., QoS Issues and Enhancements for IEEE 802.11 Wireless LAN, INRIA, pp. 1-34, Nov. 2002.
Non-Final Office Action for U.S. Appl. No. 10/880,366, mailed Jan. 12, 2010.
Non-Final Office Action for U.S. Appl. No. 10/977,470, mailed Feb. 26, 2009.
Non-Final Office Action for U.S. Appl. No. 10/977,470, mailed Jan. 14, 2008.
Non-Final Office Action on U.S. Appl. No. 10/880,366, mailed Feb. 20, 2009.
Non-final Office Action on U.S. Appl. No. 10/880,367, mailed Jan. 21, 2011.
Non-final Office Action on U.S. Appl. No. 10/880,367, mailed Aug. 3, 2010.
Non-Final Office Action on U.S. Appl. No. 10/880,367, mailed Sep. 14, 2009.
Non-Final Office Action on U.S. Appl. No. 10/880,370, mailed Apr. 6, 2006.
Non-Final Office Action on U.S. Appl. No. 10/977,469, mailed Jan. 9, 2008.
Non-Final Office Action on U.S. Appl. No. 10/977,490, mailed Sep. 14, 2011.
Non-Final Office Action on U.S. Appl. No. 13/271,394, mailed Mar. 12, 2012.
Notice of Allowance for U.S. Appl. No. 10/880,370, mailed Jun. 12, 2007.
Notice of Allowance for U.S. Appl. No. 10/977,469, mailed Feb. 10, 2009.
Notice of Allowance on U.S. Appl. No. 10/880,366, mailed Nov. 26, 2010.
Notice of Allowance on U.S. Appl. No. 10/880,366, mailed May 28, 2010.
Notice of Allowance on U.S. Appl. No. 10/880,367, mailed Jul. 21, 2011.
Notice of Allowance on U.S. Appl. No. 12/460,974, mailed Sep. 21, 2011.
Notice of Allowance on U.S. Appl. No. 10/977,470, mailed Jan. 6, 2011.
Non-Final Office Action on U.S. Appl. No. 12/460,974, mailed Mar. 24, 2010.
Palm, Plam: Providing Fluid Connectivity in a Wireless World, 2002, 10 pages.
PanGoNetworks, PanGo "Overview", Intelligent Wireless, Copyright 2003, 1 page.
PanGoNetworks, PanGo "Proximity Platform," Intelligent Wireless, Copyright 2003, 2 pages.
PanGoNetworks, PanGo Mobile Applications Suite, Intelligent Wireless, Copyright 2003, 2 pages.
PanGoNetworks, PanGo Technology, How it Works, Intelligent Wireless, Copyright 2003, 1 page.
Wentink, "Direct Stream Request Protocol (DSRP)," IEEE, pp. 1-16, Jul. 2002.
Notice of Allowance on U.S. Appl. No. 13/271,394, mailed Jan. 22, 2013.
Final Office Action on U.S. Appl. No. 13/271,394, mailed Nov. 5, 2012.
Notice of Allowance on U.S. Appl. No. 11/035,065, mailed Oct. 1, 2013.
Non-Final Office Action on U.S. Appl. No. 10/977,490, mailed Mar. 5, 2014.
Notice of Allowance on U.S. Appl. 11/035,065, mailed Mar. 20, 2014.
Kitchen, Wireless Address Resolution Protocol, IEEE, pp. 1-13, Jan. 2000.*
IEEE Std 801.11e/D3.0, Draft Supplemental to Standard for Telecommunications and Information Exchange Between Systems—LAN/MAN Specification, pp. 1-40, May 2002.*
European Search Report and Written Opinion for Application No. PCT/US2004/033487 dated Feb. 2, 2005, 14 pages.

* cited by examiner

EVENT-BASED MULTICHANNEL DIRECT LINK

Matter enclosed in heavy brackets [ ] appears in the original patent but forms no part of this reissue specification; matter printed in italics indicates the additions made by reissue.

CROSS-REFERENCE TO RELATED APPLICATIONS

[This application is a continuation-in-part of U.S. patent application Ser. No. 10/353,391 filed Jan. 29, 2003, now U.S. Pat. No. 6,791,962, issued Sep. 14, 2004, which also claims benefit of U.S. Provisional Application No. 60/388,569, filed Jun. 12, 2002, entitled "Direct Link Protocol In Wireless Local Area" and also claims benefit of U.S. patent application Ser. No. 60/515,701 filed Oct. 31, 2003 and entitled "Location Awareness in Wireless Networks," the disclosures of which are herein incorporated by reference in their entireties.]

*Notice: More than one reissue application has been filed for the reissue of U.S. Pat. No. 7,251,235. The reissue applications are application Ser. Nos. 12/460,974 (the parent of present application), and 13/351,588 (the present application).*

*This application is a continuation reissue of U.S. Ser. No. 12/460,974, filed Jul. 27, 2009, now U.S. Pat. No. Re. 43,127, granted Jan. 24, 2012, which is a reissue application of 10/880,370 filed Jun. 30, 2004, issued as U.S. Pat. No. 7,251,235, which claims benefit of U.S. Provisional Application Ser. No. 60/515,701 filed Oct. 31, 2003, entitled "Location Awareness in Wireless Networks," and is a continuation-in-part of U.S. patent application Ser. No. 10/353,391 filed Jan. 29, 2003, now U.S. Pat. No. 6,791,962, issued Sep. 14, 2004, which claims benefit of U.S. Provisional Application No. 60/388,569, filed Jun. 12, 2002, entitled "Direct Link Protocol In Wireless Local Area," the disclosures of which are herein incorporated by reference in their entireties.*

The present invention is also related to U.S. patent application Ser. No. 10/880,367 filed concurrently herewith and entitled "Direct Link Relay In a Wireless Network," U.S. patent application Ser. No. 10/880,367 filed concurrently herewith and entitled "Link Margin Notification Using Return Frame," U.S. patent application Ser. No. 10/880,325 filed concurrently herewith and entitled "Time-Scheduled Multichannel Direct Link," all claiming benefit of U.S. Provisional Application No. 60/515,701 filed Oct. 31, 2003, the entireties of which are incorporated by reference herein.

FIELD OF THE INVENTION

The present invention relates generally to wireless communications between wireless devices and more particularly to utilizing multiple wireless channels to communicate information.

BACKGROUND OF THE INVENTION

Various wireless standards, such as the Institute of Electrical and Electronics Engineers (IEEE) standards 802.11 a/b/c/e/g/i (referred to collectively as IEEE 802.11), provide for wireless connectivity between wireless devices, such as, for example, between a wireless station and an access point connected to an infrastructure network. In conventional wireless standards, the communication of information between peer wireless devices typically is routed through the access point.

To illustrate, to communicate information between a first wireless device and a second wireless device, the first wireless device wirelessly transmits one or more frames of information to the access point, where the frames designate the second wireless device as their destination. The access point then modifies the headers of the frames and transmits them for reception by the second wireless device.

The process of using the access point as an intermediary has a number of drawbacks. For one, the communication of information is delayed by routing it through the access point. Moreover, the wireless channel used by the wireless devices and access point to communicate information (also referred to as the "base" channel) may be crowded with traffic from other wireless devices similarly seeking to transmit information via the access point. As a result, access contention mechanisms often are implemented, which typically results in additional delay.

Accordingly, an improved technique for communicating information between wireless devices would be advantageous.

SUMMARY OF THE INVENTION

The present invention mitigates or solves the above-identified limitations in known solutions, as well as other unspecified deficiencies in known solutions. A number of advantages associated with the present invention are readily evident to those skilled in the art, including economy of design and resources, transparent operation, cost savings, etc.

The present invention is directed to a method of communicating information directly between the first and second wireless devices in a wireless network including an access point logically connected to at least a first wireless device and a second wireless device.

A further aspect of this invention is a method, in a wireless network including an access point operably connected to at least a first wireless device and a second wireless device, of providing information between the access point and at least one of the first and second wireless devices via a first channel for at least a portion of a first period, providing a channel change request from the first wireless device to the second wireless device on the first channel, providing an affirmative response to the channel change request from the second wireless device to the first wireless device on the first channel, switching the second wireless device to a second channel subsequent to the receipt of the acknowledgement to the provision of the affirmative response to the channel change request, switching the first wireless device to the second channel subsequent to the transmission of the acknowledgement to the receipt of the affirmative response to the channel change request; and communicating information directly between the first and second wireless devices via the second channel for at least a portion of a second period.

A further aspect of this invention is a wireless device, in a wireless network having an access point, including a transceiver, and a direct link module operably connected to the transceiver and adapted to facilitate an establishment of a wireless direct link between the wireless device and another wireless device via a second channel, communicate information with the other wireless device via the wireless direct link for at least a portion of a first period, switch the transceiver from the first channel to a second channel in anticipation of a predetermined event; and communicate information with the access point via second channel for at least a portion of a second period.

A further aspect of this invention is a wireless system including an access point and at least a first wireless device and a second wireless device. The first wireless device and a second wireless device are adapted to communicate information via a wireless direct link on a first channel during at least a portion of a first period, switch to a second channel in anticipation of a predetermined event; and communicate information with the access point on the second channel during at least a portion of a second period.

Still further features and advantages of the present invention are identified in the ensuing description, with reference to the drawings identified below.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which.

DETAILED DESCRIPTION OF THE INVENTION

The following description is intended to convey a thorough understanding of the present invention by providing a number of specific embodiments and details involving the communication of information using multiple wireless channels. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

For ease of illustration, the various techniques of the present invention are discussed below in the context of IEEE 802.11-based wireless networking. However, those skilled in the art, using the teachings provided herein, may advantageously implement the disclosed techniques in other wireless networks. Accordingly, reference to techniques and components specific to IEEE 802.11, such as an 802.11-specific frame format or a series of transmissions specific to 802.11, applies also to the equivalent technique or component in other wireless network standards unless otherwise noted. Moreover, various actions standard to IEEE 802.11 and other wireless standards, such as, for example, the transmission of an ACK frame to acknowledge receipt of a frame, are omitted for ease of discussion.

Figure 1:
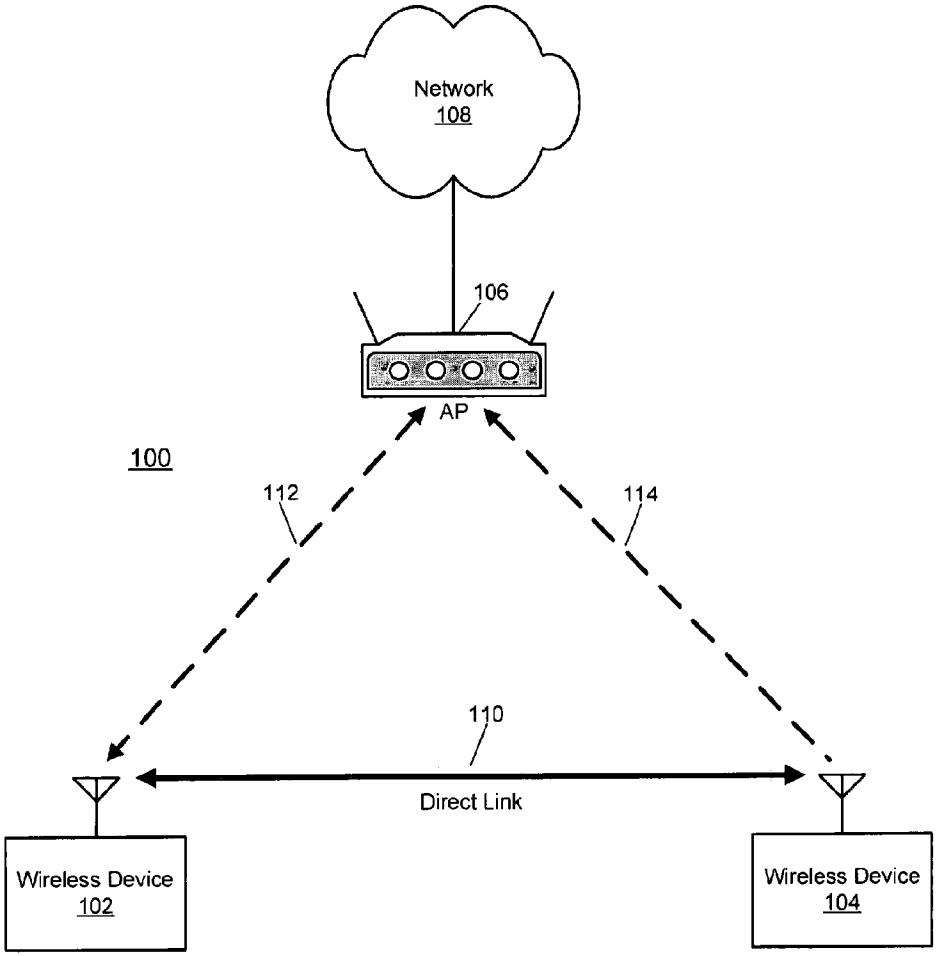
FIG. 1 is a schematic diagram illustrating an exemplary wireless system having multiple channels for communicating information between wireless devices is illustrated in accordance with at least one embodiment of the present invention.

Referring now to FIG. 1, an exemplary wireless system 100 employing one or more exemplary event-based channel switching techniques disclosed herein is illustrated in accordance with at least one embodiment of the present invention. The system 100 incorporates a general wireless network topology described in IEEE 802.11 and other wireless standards wherein a plurality of wireless devices 102, 104 are associated with at least one access point 106. The wireless devices 102, 104 include devices enabled to communicate wirelessly using one or more protocols. Such protocols may include, for example, the IEEE 802.11 protocols (802.11a/b/e/g/i), ANSI, Hyperlan, etc. Examples of wireless devices may include notebook (or "laptop") computers, handheld computers, desktop computers, workstations, servers, portable digital assistants (PDAs), cellular phones, audio/visual (A/V) consoles, gaming consoles, televisions or other displays, etc. To illustrate, the system 100 may include, for example, a multimedia system having one or more displays, audio/video components (e.g., a digital video disc (DVD) player or a compact disc (CD) player), sound systems, video game consoles, and the like, where each of these components may be wirelessly connected to a central console acting in the capacity of the access point 106.

The access point 106 may be connected to an infrastructure network 108 or other network, such as, for example, the Internet, a local area network (LAN), a wide area network (WAN), and the like. Thus, wireless devices 102, 104 may communicate with one or more networked devices on an infrastructure network via the access point 106. Moreover, the wireless devices 102, 104 may communicate with each other via conventional wireless links 112, 114 with the access point 106 or, as discussed in greater detail below, via a wireless direct link 110 between the wireless devices 102, 104 and optionally other wireless devices. Exemplary techniques for establishing and maintaining a wireless direct link are described below and in U.S. patent application Ser. No. 60/515,701, and U.S. patent application Ser. No. 60/388,569 the entirety of which is incorporated by reference herein.

In a conventional wireless network, information is communicated between wireless devices via an access point. A transmitting wireless device transmits the information to the access point on a base channel. The access point then processes the information, such as by changing the headers of one or more frames representing the information, and forwards the information to the receiving wireless device on the base channel. This use of the access point as the intermediary results in a delay in the overall transmission time for the information, as well as crowds the base channel because two transmissions take place, rather than one. Moreover, these transmissions may have been further delayed due to congestion on the base channel by other transmitting devices. Furthermore, the distances to the access point may be much larger than the distance between the communicating devices, which allows the communicating devices to use much higher data rates on direct communications.

Accordingly, the present invention provides techniques for enabling wireless devices to communicate information directly without use of the access point, while still permitting the transfer of information from the access point to the wireless devices, and vice versa. In at least one embodiment, conventional wireless links 112, 114 between the access point 106 and the wireless devices 102, 104, respectively, may be used to initiate, establish and maintain a wireless direct link 110 between the wireless devices 102, 104. The wireless direct link 110 preferably is shifted to a parallel wireless channel (i.e., separate from the base channel) so that the transmission of information via the direct link 110 is not significantly impaired by traffic on the base channel, and vice versa.

Additionally, in at least one embodiment, the wireless devices 102, 104 may be configured to switch back to the base channel or other wireless channel to receive buffered downlink information or peer-to-peer information from the access point 106 or to transmit uplink information or peer-to-peer information to the access point 106, for example. The switch between the parallel channel and the base channel may occur in anticipation of a predetermined event, such as the periodic transmission of a delivery traffic indication map (DTIM) beacon frame by the access point 106, or the switch from the parallel channel to the base channel, or vice versa, may be initiated by either of the wireless devices 102, 104.

Figure 2:
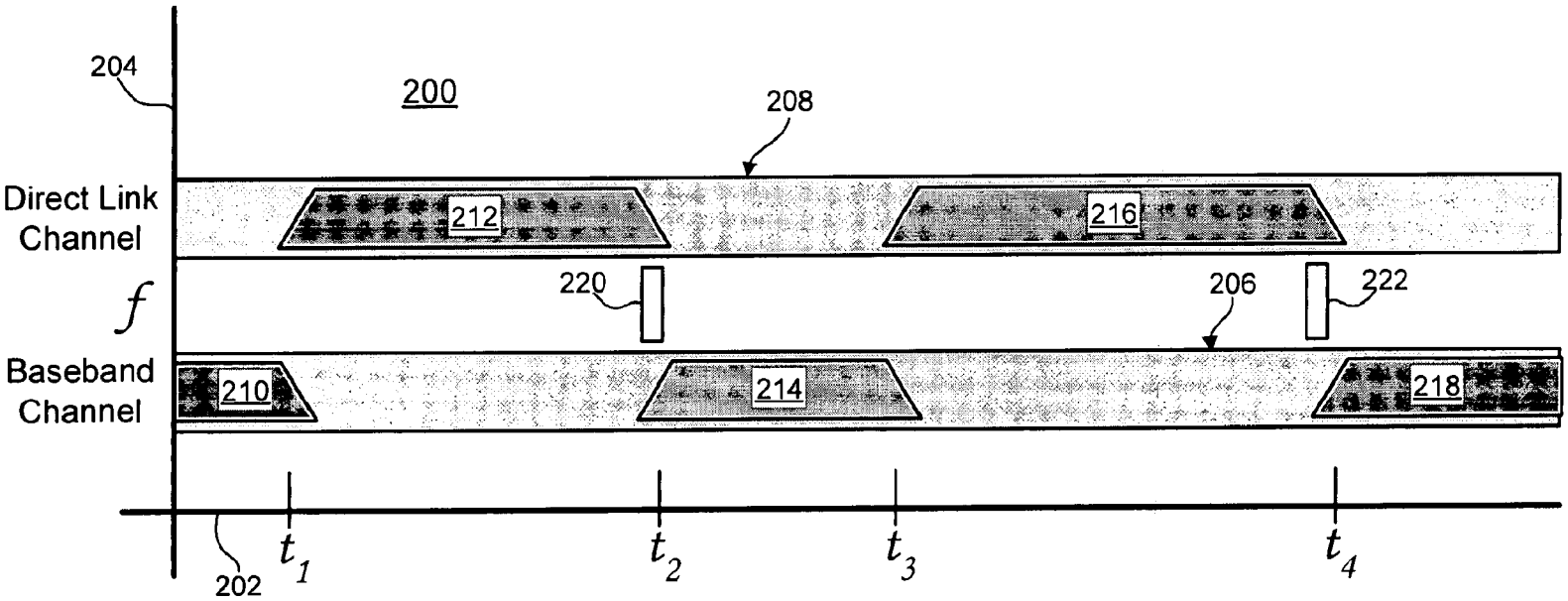
FIG. 2 is a chart illustrating an exemplary event-based channel switch process for the wireless devices of FIG. 1 in accordance with at least one embodiment of the present invention.

Referring now to FIG. 2, a chart 200 depicting an exemplary event-based channel switching process is illustrated in accordance with at least one embodiment of the present invention. The ordinate 202 of the chart 200 represents time, whereas the abscissa 204 represents at least a portion of the frequency bandwidth in which the system 100 operates. In the illustrated example, base channel 206 represents the wireless channel used by the access point 106 to communicate with the wireless devices 102, 104, and vice versa. Parallel channel 208 represents a channel used by wireless devices 102, 104, to shift wireless direct link 110 to.

To illustrate, transmission period 210 may represent a direct link handshake period conducted on the base channel 206 to initiate and establish the direct link 110 on the parallel channel 208 for direct transmission of information between the wireless devices. An exemplary process for initiating and establishing a direct link 110 on a parallel channel is described in greater detail below with reference to FIG. 4. The direct link 110 may be established on parallel channel 208 for any of a variety of reasons, such as to reduce bandwidth congestion by using multiple channels to transmit information or to reduce latency in the transmission of information between the wireless devices 102, 104. After establishing the direct link 110 on parallel channel 208, the wireless devices 102, 104 switch to parallel channel 208 at or around time $t_1$. The subsequent transmission period 212 may represent a time period wherein information may be communicated between the wireless devices 102, 104 via the direct link 110 on parallel channel 208. To inform the access point about the temporary absence from the base channel, the wireless devices 102 and 104 transmit a frame to the access point with the PM bit set, to indicate to the access point that they cannot be reached. In reality, the nodes are on the parallel channel and are most likely not in power save, but there is no difference from the viewpoint of the access point because the wireless nodes cannot be reached in either case. The access point will buffer traffic for these nodes in separate power save queues, for later delivery.

Although the wireless devices 102, 104 may directly communicate information via the direct link 110 on parallel channel 208, the wireless devices 102, 104 may need to return to the base channel 206 or another channel on a periodic basis in order to receive information from the access point 106 or other wireless device and/or to provide uplink information to the access point 106 or peer wireless devices. To illustrate, the wireless devices 102, 104 may be unable to receive information from the access point 106 while their transceivers are tuned to the parallel channel 208 during transmission period 212. Accordingly, the access point 106 may buffer information intended for the wireless devices 102, 104 during the transmission period 212. As detailed in many wireless standards, access points typically periodically transmit information that indicates that the access point has buffered information for one or more wireless devices associated with the access point. For example, IEEE 802.11 provides for the periodic transmission of a delivery traffic indication map (DTIM) beacon frame every DTIM period or at a target beacon transmission time (TBTT). The traffic indication map of the DTIM beacon frame indicates which wireless devices have information buffered at the access point.

Thus, in one embodiment, wireless devices 102, 104 switch back to the base channel 206 in anticipation of a predetermined event 220 (occurring, for example, at time $t_2$), where the predetermined event 220 may include, for example: the transmission of buffered information, broadcast and/or multicast information by the access point 106 on the base channel 206; the transmission of an indication of buffered information by the access point 106, such as, for example, a DTIM beacon frame; and the like. In this instance, the wireless devices 102, 104 may use the indication of buffered information to determine whether they have information buffered at the access point 106 and then may request this information from the access point 106 using, for example, a Power Save (PS)-Poll frame. Thus, the transmission period 214 may represent the transmission of multicast, broadcast, and buffered unicast information from the access point 106 to the wireless devices 102, 104, the transmission of uplink information from the wireless devices 102, 104 to the access point 106, the transmission of peer-to-peer information between the wireless devices 102, 104 and other wireless devices, and the like.

At or about time $t_3$, the wireless devices 102, 104 may switch back to parallel channel 208 and continue communicating information directly via the direct link 110 during transmission period 216. Alternatively, the wireless devices 102, 104 may initiate, establish and use a wireless direct link on a different channel In either instance, the wireless devices 102, 104 may switch back to the base channel 206 in anticipation of another predetermined event 222, e.g., the transmission of another DTIM map, at or around time $t_4$. Once switched to the base channel 206, information between the access point 106, the wireless devices 102, 104 and/or other wireless devices may be communicated as described above during transmission period 218. The process of switching between channels to alternatively transmit information over a direct link on one channel and communicate with the access point 106 or other wireless device on another channel may continue for any number of cycles as appropriate. Note that the direct link can always be used, irrespective of whether the wireless devices 102 and 104 reside on the parallel channel or on the base channel.

Figure 3:
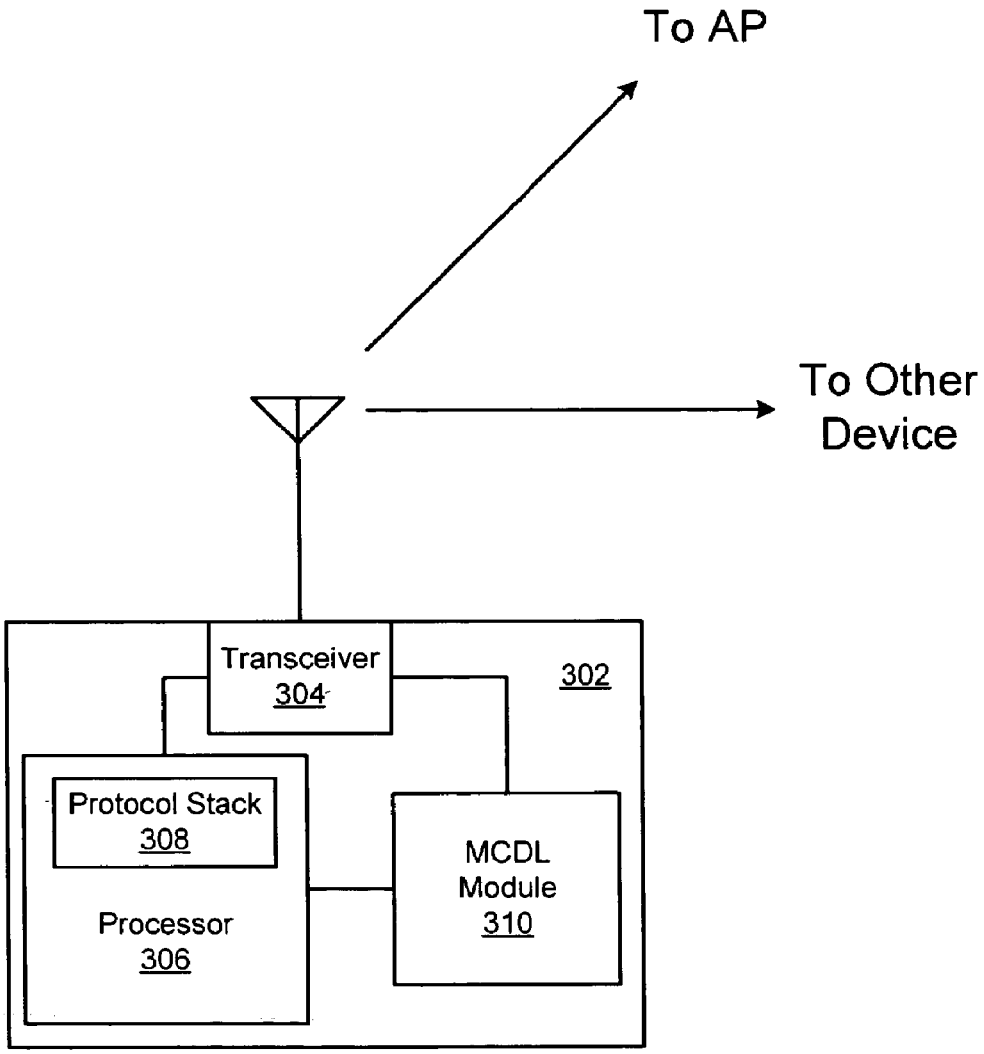
FIG. 3 is a schematic diagram illustrating an exemplary wireless device in greater detail in accordance with at least one embodiment of the present invention.
Figure 4:
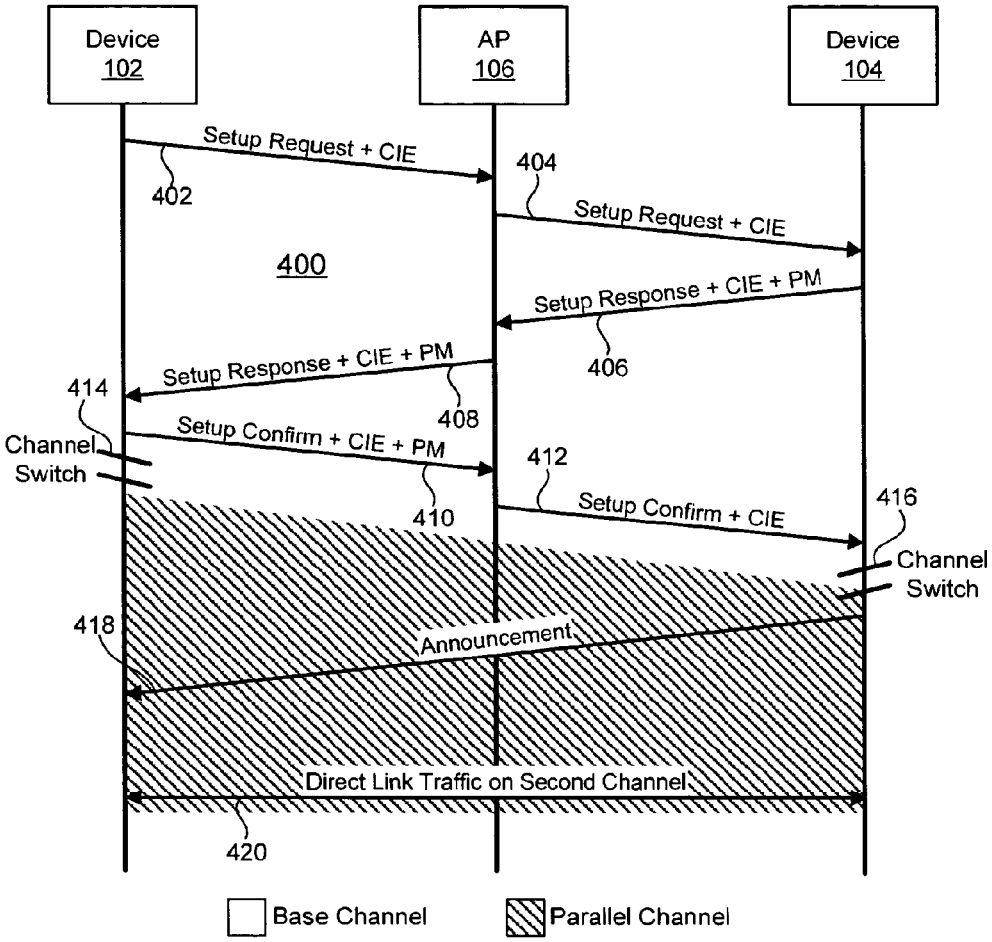
FIG. 4 is a flow diagram illustrating an exemplary method for establishing a wireless direct link on a parallel channel in accordance with at least one embodiment of the present invention.
Figure 5:
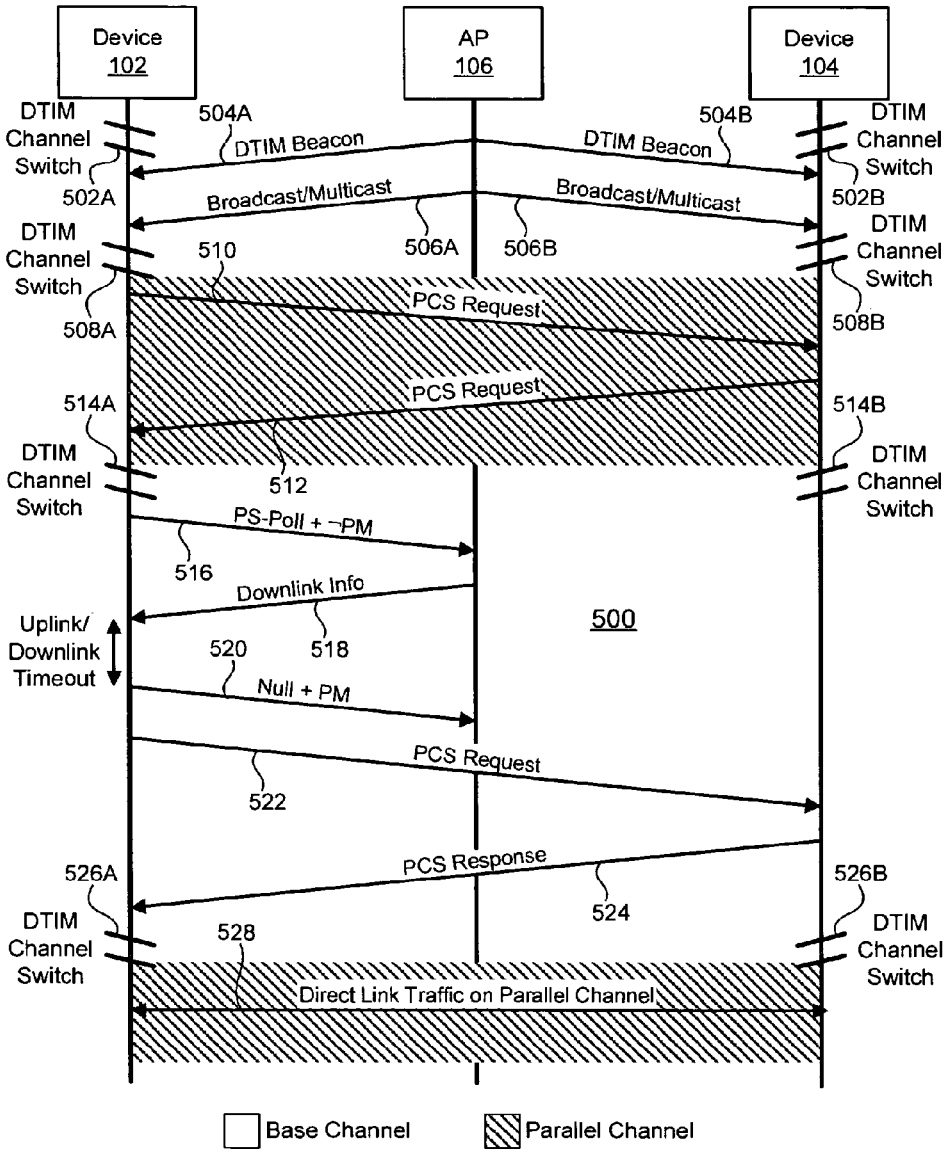
FIG. 5 is a flow diagram illustrating an exemplary event-based channel switch process in accordance with at least one embodiment of the present invention.

Referring now to FIGS. 3-5, an exemplary configuration for wireless devices 102, 104 (illustrated as wireless device 302), as well as exemplary methods 400 and 500 of its operation are illustrated in accordance with at least one embodiment of the present invention. Although certain actions are attributed to either wireless device 102 or wireless device 104 for ease of reference, those skilled in the art will appreciate that some or all of these actions may be performed by either wireless device 102 or wireless device 104.

In the illustrated example of FIG. 3, the wireless device 302 (representative of either wireless device 102 or 104) includes at least a transceiver 304 for transmitting and/or receiving signals representing information, one or more processors 306 and protocol stacks 308 for processing and otherwise preparing information for transmission via the transceiver 304, as well as for processing information received via the transceiver 304. The wireless device 302 further may include a multiple channel direct link (MCDL) module 310 for initiating, establishing, and maintaining a one or more wireless direct links on one or more channels, communicating information via the one or more wireless direct links, switching between channels as appropriate, and other various actions described in detail herein. The MCDL module 310 may be implemented as software, hardware, firmware, or a combination thereof. To illustrate, the MCDL module 310 may be implemented as a software component of the protocol stack 308, as a separate software program or module executed by the processor 306, or as a software or hardware component implemented as part of the transceiver 304.

Referring now to FIG. 4, an exemplary method 400 for initiating and establishing a wireless direct link on a separate channel is illustrated in accordance with at least one embodiment of the present invention. To initiate a direct link on a channel other than the base channel used by the AP 106, one of the wireless devices 102, 104 (device 102 in this example) may transmit a setup request frame to the access point 106 on the base channel for forwarding to the wireless device 104 at step 402, where the setup request frame represents an invitation or proposal to establish a direct link on another channel. To this end, the setup request frame may include a channel information element (CIE) (e.g., in the payload of the frame), where the CIE may include one or more indicators associated with a proposed channel, such as, for example, the center frequency and channel width of the proposed channel or a low frequency and a high frequency of the proposed channel. The proposed channel may be selected at random, or, in one embodiment, the wireless device 102 may scan one or more potential channels for traffic and select a channel having relatively little or no traffic as the proposed channel.

The setup request may be encapsulated inside a regular data frame, using LLC encapsulation. This method is described in more detail in U.S. patent application Ser. No. 60/515,701, which has been referenced before. Security credentials may also be included inside the setup frames. Due to the encapsulation in a regular data frame, any access point will forward the frame to the ultimate destination without processing the data portion, irrespective of whether the access point knows about this protocol or not. The LLC encapsulation effectively creates a transparent tunnel through the access point.

The access point 106 may process the setup request frame as necessary and forward the setup request frame to the wireless device 104 at step 404. Access points will usually forward this data frame without additional processing of the payload. Upon receipt of the setup request frame, the wireless device 104 may consider the proposal to establish a direct link on the proposed channel. If acceptable, the wireless device 104 may transmit an affirmative setup response frame to the access point 106 on the base channel for forwarding to the wireless device 102 at step 406. If the proposal to establish a direct link is acceptable but the proposed channel is not (because, for example, the wireless device 104 cannot operate at the proposed frequency), the wireless device 104 may transmit a conditional setup response frame to the access point 106 on the base channel for forwarding to the wireless device 102. The conditional setup response frame may include a proposal for an alternate channel for consideration by the wireless device 102.

If the proposal to establish a direct link is unacceptable (e.g., the wireless device 104 does not have a multiple channel direct link capability), the wireless device 104 may transmit a negative setup response frame to the wireless device 102 indicating that the wireless device 104 has declined to participate in a direct link with the wireless device 102. In this instance, the wireless device 102 may attempt to set up a direct link 110 on the base channel or it may cease attempts to establish a direct link 110 with the wireless device 104. In at least one embodiment, the setup response frame includes an agreed/denied/conditional field that may be used to indicate whether the setup response is affirmative, negative or conditional. If the responding device does not support direct link, it may not recognize the multi channel capability (i.e. the CIE element), and it may respond with a response message that does not include a multi channel capability element (i.e. the CIE element). In this way, a direct link may still be set up, but possibly without the option of being shifted to another channel.

If the setup response frame is affirmative or conditional, the setup response frame may further include an indication that the wireless device 104 is entering a sleep mode or power-saving mode whereby the access point 106 is to buffer all information intended for the wireless device 104 until the access point 106 is polled for the buffered information. The power-saving mode indicator may include, for example, a power management (PM) bit set or cleared in the header of the setup response frame. Upon receipt of the setup response frame, the access point 106 preferably enacts the buffering mechanism if so directed by the power-saving mode indicator and forwards the setup response frame to the wireless device 102 at step 408.

If the setup response frame is an affirmative response, the wireless device 102 may transmit a setup confirm frame to the access point 106 for forwarding at step 410. If the response is conditional upon acceptance of the use of the channel proposed by the wireless device 104, the wireless device 102 may determine whether this proposed channel is acceptable. If so, the wireless device 102 may transmit the setup confirm frame at step 410. If the response is negative, the wireless device 102 preferably ceases any attempts to establish a direct link. As with the setup response frame, the setup confirmation frame may include an indication (e.g., a set PM bit) that the wireless device 102 is entering a sleep mode or power-saving mode and information intended for the wireless device 102 should be buffered at the access point 106. Upon receipt of the setup confirm frame, the access point 106 may activate the buffering mechanism and forward the setup confirm frame to the wireless device 104 on the base channel at step 412.

Upon transmitting the setup confirm frame at step 410, in one embodiment, the wireless device 102 switches its transceiver 304 to the agreed-to channel and waits for the arrival of the wireless device 104 at step 414. Likewise, the wireless device 104 switches its transceiver 304 to the proposed channel upon receipt of the setup confirm frame at step 416. To announce its presence on the proposed channel, the wireless device 104 may transmit an announcement frame on the proposed channel directly to the wireless device 102 at step 418. At this point, the direct link 110 may be considered to be established and the wireless devices 102, 104 may initiate the communication of information on the parallel channel via the direct link 110 at step 420.

In another embodiment, devices 102 and/or 104 do not set the PM bit on the direct link handshake frames, but separate frames with the PM bit set are transmitted instead. These frames may be Null frames or regular data frames. Shifting the direct link to another channel is postponed until after the transmission of these separate PM frames. Shifting the direct link may be accomplished by a permanent or temporary channel switch, which are discussed in detail below. The direct link handshake may still include a multi channel capability or a set of supported channels to which the direct link could be transferred.

There may be a delay between when the wireless device 102 switches to the parallel channel and when the wireless device 104 switches. In one embodiment, the wireless device 102 may use this waiting period to scan the parallel channel to listen for traffic on the parallel channel. The arrival of wireless device 104 may be announced by the transmission of a first frame, which opens the direct link on the new channel. If the scan reveals that there is excessive traffic, the wireless device 102 may suspend or cancel the direct link by transmitting, for example, a slow resumption mode (SRM) frame or a fast resumption mode (FRM) frame, or the wireless device 104 may transmit a channel switch request to the wireless device 104 once the wireless device 104 has switched to the parallel channel, where the channel switch request represents a proposal to switch the direct link to another parallel channel. Permanent and temporary channel switch requests are discussed in detail below.

During the direct link setup phase described above, peer-to-peer traffic through the access point is preferably is temporarily suspended to avoid any reordering of frames waiting at the access point 106. As noted above, the wireless devices 102, 104 may use a power-saving mode indicator, such as, for example, the PM bit, to notify the access point 106 that the devices 102, 104 are entering a power-save mode and therefore directing the access point 106 to buffer downlink data until it is requested from the wireless devices via, for example, power mode-poll (PM-Poll) frames as described by IEEE 802.11.

Referring now to FIG. 5, an exemplary event-based channel switch process 500 is illustrated in accordance with at least one embodiment of the present invention. In the illustrated example, the method 500 initiates at steps 502A and 502B wherein the wireless devices 102, 104 switch from the parallel channel (established using method 400 of FIG. 4, for example) to the base channel of the access point 106 in anticipation of, or in preparation for, a predetermined event. In the illustrated example, the predetermined event includes the transmission of a DTIM beacon frame at steps 504A, 504B. As described above, DTIM beacon frames typically are transmitted substantially periodically (i.e., every DTIM beacon interval) and include a bitmap that indicates which wireless devices have information buffered at the access point 106. Thus, it generally is desirable for the wireless devices 102, 104 to switch to the base channel to receive the DTIM beacon frames so that the wireless devices 102, 104 may determine whether there is information waiting for them at the access point 106. Accordingly, the wireless devices 102, 104 preferably switch to the base channel slightly before the DTIM beacon is scheduled to be transmitted to help ensure that the wireless devices 102, 104 are switched to the base channel in time to receive the DTIM beacon frame. Moreover, the wireless devices 102, 104 may remain on the base channel after receiving the DTIM beacon frame the transmission of broadcast and multicast information (steps 506A and 506B) typically follows the transmission of a DTIM beacon frame.

In at least one embodiment, the wireless devices 102, 104 are configured to switch back to the parallel channel at steps 508A and 508B after receiving the DTIM beacon frame and any multicast/broadcast information. If one or both of the wireless devices 102, 104 determine that they have buffered information at the access point 106 using the DTIM beacon frame, the wireless device (device 102 in this example) may transmit a permanent channel switch (PCS) request frame on the parallel channel with a request to switch back to the parallel channel to the other wireless device at step 510. In this case, the PCS request frame represents a request to switch to a proposed channel and includes one or more indicators of the proposed channel, such as, for example, the center frequency and channel width or a low frequency and a high frequency for the proposed channel. If the proposed channel switch is acceptable to the receiving wireless device (device 104 in this example), the receiving wireless device sends an affirmative PCS response frame on the parallel channel at step 512. If the proposed channel switch is unacceptable (e.g., the receiving wireless device cannot operate at the proposed frequency), the receiving wireless device may transmit a conditional PCS response frame having an alternate proposed channel or a negative PCS response frame if no alternate channel is acceptable. If conditional, the wireless devices 102, 104 negotiate an channel acceptable to both wireless devices 102, 104 or if negative, the wireless devices 102, 104 may cease communicating on the parallel channel and return to the base channel.

In another embodiment, a parallel channel may have been agreed upon during the setup phase and the PCS request may not contain an explicit channel information element. The receipt of a PCS request simply indicates in that case that a switch to the other channel is requested, i.e. the parallel channel if transmitted on the base channel and the base cannel if transmitted on the parallel channel.

In another embodiment, the wireless devices 102, 104 may stay on the base channel after the end of the broadcast and multicast transmissions, while returning to the parallel channel is signaled by an explicit PCS request.

The PCS request and response frames preferably are transmitted as quality-of-service (QoS) frames having a piggyback contention-free-acknowledgement (CF-Ack) as this type of frame typically requires only a single transmission operation (TXOP). Examples of suitable piggyback frames that may be implemented as PCS request and/or response frames are described in detail in U.S. patent application Ser. No. 10/880,367 filed concurrently herewith and entitled "Link Margin Notification Using Return Frame." Other frame formats, such as conventional data frames, may be used without departing from the spirit or the scope of the present invention.

Upon agreeing to a proposed switch to the base channel, the wireless devices 102, 104 make the channel switch at steps 514A, 514B. One or both of the wireless devices 102, 104 then may request and receive buffered information from the access point 106, provide uplink information to the access point 106, and/or communicate information with peer wireless devices via the base channel. To illustrate, the wireless device 102 may use a reverse polling technique by transmitting a PS-Poll frame (e.g., a QoS+CF+Poll frame) to the access point 106 at step 516, where the PS-Poll frame represents a request for buffered information and an indication (e.g., a clearing of the PM bit) that the wireless device 102 has exited the power-saving mode. In response to the PS-Poll frame, the access point 106 may transmit buffered downlink information to the wireless device 102 at step 518. After the wireless device 102 has received the buffered downlink information (as indicated by the expiration of an uplink or downlink timeout), the wireless device 102 may transmit another frame, such as a null frame, to the access point 106 at step 520, where the frame includes an indicator that the wireless device 102 is entering the power-saving mode so that the access point 106 may buffer any downlink information intended for the wireless device 102. Uplink information and peer-to-peer information may be transmitted from the wireless devices 102, 104 in a similar manner.

To return to the parallel channel to resume communicating via the direct link 110, one of the wireless devices (device 102 in this example) may transmit a PCS request frame on the base channel at step 522, where the PCS request frame may include an indication of the proposed channel to which the wireless devices 102, 104 are to switch. Preferably, the wireless devices 102, 104 switch to the same parallel channel as before. However, it may be appropriate to switch to another channel because, for example, the original parallel channel has become congested with traffic from other wireless devices or significant interference as appeared at one or more frequencies of the original parallel channel.

If the proposed channel is acceptable to the receiving wireless device (device 104 in this example) or if an alternate channel is to be proposed, the wireless device 104 may transmit an affirmative or conditional PCS response frame to the wireless device 102 on the base channel at step 524. After agreeing to the channel switch, the wireless devices switch to the proposed parallel channel and recommence the communication of information between the wireless devices 102, 104 via the direct link 110 on the parallel channel at step 528.

In addition or as an alternate to using a PCS sequence to switch channels, the wireless devices 102, 104 may utilize a temporary channel switch (TCS) sequence to temporarily move the direct link 110 to another channel. The TCS sequence typically includes a TCS request frame that may include a CIE and a timing synchronization function (TSF) to indicate the time at which the direct link 110 is scheduled to return to the current channel. The TCS sequence also may include a TCS response frame that includes an agreed/denied/conditional field similar to the field used for the PCS response frame. If the responding wireless device can not leave the current channel, for instance if it is not yet in a power-save mode with the access point 106, it may set the denied field inside the TCS response frame. Otherwise, if the responding wireless device is ready to move to the proposed channel, it may set the agreed field inside the TCS response frame.

The TCS sequence also may be used to temporarily move the direct link 110 to the base channel for the exchange of information with the access point 106 (e.g., buffered information) or with peer devices. The direct link 110 preferably remains active during this time, so that information can be exchanged via the direct link 110 on the base channel as well. Devices 102 and 104 should not leave the power save state with the access point during this temporary stay on the base channel (for instance, by transmitting a frame to the access point with the PM bit reset), because it can not be ensured that they will be able to re-enter the power save state prior to the scheduled departure to the parallel channel with TCS.

Although the above techniques are described in the context of a direct link established between two devices, in some cases, multiple devices each may establish a direct link with a single device. The presence of multiple direct links raises the issue of selecting a common parallel channel for the multiple direct links. In one embodiment, the wireless device acting as the "hub" for the multiple peer devices may identify a suitable parallel channel that the multiple direct links may use by, for example, proposing a parallel channel currently in use, by scanning one or more other parallel channels, or by picking a channel at random. Another issue raised by multiple direct links includes channel switching. In one embodiment, if a device having multiple direct links wants to perform a channel switch, it preferably transmits a PCS request frame to each of the other direct link peer devices before switching to the proposed channel.

Yet another issue includes the implementation of power saving or the sleep mode. In one embodiment, this issue may be addressed by assuming that the traffic pattern has a star topology, so that there is a central node that communicates with the peripheral nodes, but the peripheral nodes do not communicate with each other. Under this assumption, the central node may be treated as a constantly awake node (CAN) that acts as a surrogate access point by buffering information for all of the peripheral nodes, while maintaining a client association with the real access point at the same time. The peripheral nodes find can find the central node through its beacon transmissions and may associate with it instead of with the access point. The peripheral nodes then may use reverse polling to retrieve buffered information, as described above. This solution is suited for applications like gaming and multimedia, where a single central node maintains connections with several remote nodes, like game controllers or actuators, respectively.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

[1. In an 802.11x wireless network comprising an access point logically connected to at least a first wireless device and a second wireless device, a method of establishing a point-to-point connection directly between the first and second wireless devices comprising:

sending a setup request frame from the first wireless device to the second wireless device on a first communication channel via the access point, the setup request frame including a proposed second communication channel;

sending a setup response frame from the second wireless device to the first wireless device on the first communication channel via the access point; and communicating information directly between the first and second wireless devices on the second communication channel for a first time period.]

[2. The method as in claim 1, further comprising:

switching the first and second wireless devices from the second channel to the first channel in anticipation of a predetermined event; and communicating information between the access point and at least one of the first and second wireless devices via the first channel for at least a portion of a second time period.]

[3. The method as in claim 2, further comprising:

switching the first and second wireless devices from the second channel to the first channel prior to the second time period.]

[4. The method as in claim 2, further comprising:

switching the first and second wireless devices from the second channel to a third channel; and communicating, for a third time period, information directly between the first and second wireless devices the second channel.]

[5. The method as in claim 4, wherein switching the wireless devices to the third channel comprises:

providing a setup confirmation from the first wireless device to the second wireless device via the access point, the setup confirmation confirming the suitability of a wireless direct link on the third channel;

switching the first wireless device to the third channel subsequent to the transmission of the setup confirmation; and switching the second wireless device to the third channel subsequent to the receipt of the setup confirmation.]

[6. The method as in claim 5, wherein establishing the second wireless direct link on the third channel comprises:

providing, on the second channel, a setup request from the first wireless device to the second wireless device via the access point, the setup request including one or more identifiers of the third channel; and providing, on the second channel, an affirmative setup response from the second wireless device to the second wireless device via the access point in response to a receipt of the setup request at the second device;

wherein the setup confirmation is provided in response to a receipt of the affirmative setup response at the first wireless device.]

[7. The method as in claim 6, wherein the one or more identifiers of the third channel includes a center frequency and a channel width.]

[8. The method as in claim 7, further comprising:

scanning at least one channel to identify an unused channel, the unused channel being selected as the third channel.]

[9. The method as in claim 7, further comprising:

randomly selecting one of a plurality of channels as the third channel.]

[10. The method as in claim 2, wherein the predetermined event includes a substantially periodic event.]

[11. The method as in claim 10, wherein the predetermined event includes a periodic transmission of an indication of information buffered at the access point, wherein at least a portion of the buffered information is intended for receipt by at least one of the first and second wireless devices.]

[12. The method as in claim 11, wherein the indication from the access point includes a delivery traffic indication map (TIM) beacon frame.]

[13. The method as in claim 10, wherein the predetermined event includes the delivery of broadcast and multicast data.]

[14. The method as in claim 1, wherein the second channel includes a base channel for communicating information between the access point to at least the first and second wireless devices.]

[15. In an 802.11x wireless network comprising an access point operably connected to at least a first wireless device and a second wireless device, a method of establishing a direct point-to-point connection between the two wireless devices comprising:

providing information between the access point and at least one of the first and second wireless devices via a first channel for at least a portion of a first period;

providing a channel change request from the first wireless device to the second wireless device on the first channel;

providing an affirmative response to the channel change request from the second wireless device to the first wireless device on the first channel;

switching the second wireless device to a second channel subsequent to the receipt of the acknowledgement to the provision of the affirmative response to the channel change request;

switching the first wireless device to the second channel subsequent to the transmission of the acknowledgement to the receipt of the affirmative response to the channel change request; and communicating information directly between the first and second wireless devices via the second channel for at least a portion of a second period, wherein the 802.11x wireless network is configured to facilitate communications in an 802.11x protocol, and wherein the first channel is different than the second channel.]

[16. The method as in claim 15, wherein the channel change request includes an indication of a proposed center frequency and channel width for the second channel and wherein the affirmative response to the channel change request includes an affirmation of the proposed center frequency and channel width for the second channel.]

[17. The method as in claim 15, wherein the information communicated during at least a portion of the second period includes information buffered at the access point during the first period and having at least one of the first and second wireless devices as an intended recipient.]

[18. The method as in claim 15, wherein the first and second wireless devices switch from the first channel to the second channel in anticipation of a predetermined event.]

[19. The method as in claim 18, wherein the predetermined event includes a substantially periodic event.]

[20. The method as in claim 19, wherein the predetermined event includes a periodic transmission of an indication of information buffered at the access point, wherein at least a portion of the buffered information is intended for receipt by at least one of the first and second wireless devices.]

[21. The method as in claim 20, wherein the indication from the access point includes a delivery traffic indication map (TIM) frame.]

[22. In a wireless network having an access point, at least one wireless device comprising:

a transceiver; and a direct link module operably connected to the transceiver and configured to:

facilitate an establishment of a wireless direct link between the wireless device and another wireless device on the network via a second frequency channel;

communicate information with the other wireless device via the wireless direct link on the second frequency channel for at least a portion of a first period;

switch the transceiver from the second frequency channel to a base channel in anticipation of a predetermined event; and communicate information with the access point via the base channel for at least a portion of a second period, wherein the second frequency channel is different than the base channel.]

[23. The wireless device as in claim 22, wherein the direct link module is adapted to facilitate the establishment of the wireless direct link by:

providing a channel setup request to the other wireless device via the access point and the base channel;

receiving an affirmative response to the setup request from the other wireless device via the base channel;

providing a setup confirmation to the other wireless device via the base channel; and tuning the transceiver to the second channel subsequent to the provision of the setup confirmation.]

[24. The wireless device as in claim 23, wherein the setup request includes an indication of a proposed center frequency and channel width for the second channel.]

[25. The wireless device as in claim 22, wherein the direct link module is adapted to facilitate the establishment of the wireless direct link by:

receiving a channel setup request from the other wireless device via the access point and the base channel;

providing an affirmative response to the setup request to the other wireless device via the base channel;

receiving a setup confirmation from the other wireless device via the base channel; and tuning the transceiver to the second channel subsequent to the receipt of the setup confirmation.]

[26. The wireless device as in claim 25, wherein the setup request includes an indication of a proposed center frequency and channel width for the second channel.]

[27. The wireless device as in claim 26, wherein the direct link module is adapted to facilitate the establishment of the wireless direct link by:

providing a channel change request to the other wireless device via the access point;

receiving an affirmative response to the channel request from the other wireless device via the access point;

tuning the transceiver to the second channel subsequent to the receipt of the affirmative response.]

[28. The wireless device as in claim 22, wherein the direct link module is adapted to facilitate the establishment of the wireless direct link by:

receiving a channel change request from the other wireless device via the access point;

providing an affirmative response to the channel request to the other wireless device via the access point; and tuning the transceiver to the second channel subsequent to the provision of the affirmative response.]

[29. The wireless device as in claim 22, wherein the predetermined event includes a substantially periodic event.]

[30. The wireless device as in claim 29, wherein the predetermined event includes a periodic transmission of an indication of information buffered at the access point during the first period, wherein at least a portion of the buffered information is intended for receipt by at least one of the first and second wireless devices.]

[31. The wireless device as in claim 30, wherein the indication from the access point includes a delivery traffic indication map (TIM) frame.]

[32. The wireless device as in claim 22, further comprising:

at least one processor; and wherein the direct link module includes executable instructions adapted to manipulate the processor to:

facilitate the establishment of the wireless direct link;

communicate information with the other wireless device via the wireless direct link;

switch the transceiver from the first channel to the base channel in anticipation of the predetermined event; and communicate information with the access point via the wireless direct link on the base channel.]

[33. A wireless system comprising:

an access point; and at least a first wireless device and a second wireless device;

wherein the first wireless device and the second wireless device are configured to:

communicate information via a wireless direct link on a first channel during at least a portion of a first period;

switch to a second channel in anticipation of a predetermined event; and communicate information with the access point on the second channel during at least a portion of a second period, wherein the first channel is different than the second channel.]

[34. The wireless system as in claim 33, wherein the predetermined event includes a substantially periodic event.]

[35. The wireless system as in claim 34, wherein the predetermined event includes a periodic transmission of an indication of information buffered at the access point during the first period, wherein at least a portion of the buffered information is intended for receipt by at least one of the first and second wireless devices.]

[36. The wireless system as in claim 35, wherein the indication from the access point includes a delivery traffic indication map (DTIM) frame.]

*37. A method comprising:*

*sending, from a first wireless device, a setup request frame to a second wireless device on a first communication channel via an access point, wherein the setup request frame comprises a proposed second communication channel;*

*receiving a setup response frame, at the first wireless device from the second wireless device, on the first communication channel via the access point, wherein the setup response frame comprises a proposed third communication channel;*

*sending, from the first wireless device, a setup confirm frame to the second wireless device on the first communication channel via the access point; and*

*communicating information directly between the first wireless device and the second wireless device on the third communication channel.*

*38. The method of claim 37, further comprising returning to the first communication channel after a time period.*

*39. The method of claim 37, wherein the setup confirm frame comprises an indication to the access point that the first wireless device is entering a power-saving mode.*

*40. The method of claim 37, further comprising:*

*returning to the first communication channel after a time period; and*

*receiving, at the first wireless device, buffered data from the access point.*

*41. The method of claim 37, further comprising:*

*scanning the third communication channel;*

*determining an amount of traffic on the third communication channel; and*

*suspending use of the third communication channel by the first wireless device and the second wireless device based upon the amount of traffic on the third communication channel.*

*42. The method of claim 41, further comprising transmitting a channel switch request based upon the amount of traffic on the third communication channel, wherein the channel switch request comprises a proposed fourth communication channel.*

*43. The method of claim 37, further comprising:*

*periodically returning to the first communication channel for a period of time; and*

*returning to the third communication channel after the period of time.*

*44. A wireless device comprising:*

*one or more processors configured to:*

*control sending, to another wireless device, a setup request frame on a first communication channel via an access point, wherein the setup request frame comprises a proposed second communication channel;*

*control receiving a setup response frame from the other wireless device on the first communication channel via the access point, wherein the setup response frame comprises a proposed third communication channel;*

*control sending a setup confirm frame to the other wireless device on the first communication channel via the access point; and*

*control communicating information directly with the other wireless device on the third communication channel.*

*45. The wireless device of claim 44, wherein the one or more processors are further configured to control returning to the first communication channel after a time period.*

*46. The wireless device of claim 44, wherein the setup confirm frame comprises an indication to the access point that the wireless device is entering a power-saving mode.*

*47. The wireless device of claim 44, wherein the one or more processors are further configured to:*

*control returning to the first communication channel after a time period; and*

*control receiving buffered data from the access point.*

*48. The wireless device of claim 44, wherein the one or more processors are further configured to:*

*control scanning the third communication channel; determine an amount of traffic on the third communication channel; and*

*suspend use of the third communication channel by the wireless device and the other wireless device based upon the amount of traffic on the third communication channel.*

*49. The wireless device of claim 48, wherein the one or more processors are further configured to control transmitting a channel switch request based upon the amount of traffic on the third communication channel, wherein the channel switch request comprises a proposed fourth communication channel.*

*50. The wireless device of claim 44, wherein the one or more processors are further configured to:*

*control periodically returning to the first communication channel for a period of time; and*

*control returning to the third communication channel after the period of time.*

*51. A non-transitory computer-readable medium having instructions stored thereon, the instructions comprising:*

*instructions to control sending, to another wireless device, a setup request frame on a first communication channel via an access point, wherein the setup request frame comprises a proposed second communication channel;*

*instructions to control receiving a setup response frame from the other wireless device on the first communication channel via the access point, wherein the setup response frame comprises a proposed third communication channel;*

*instructions to control sending a setup confirm frame to the other wireless device on the first communication channel via the access point; and*

*instructions to control communicating information directly with the other wireless device on the third communication channel.*

*52. The non-transitory computer-readable medium of claim 51, further comprising instructions to control returning to the first communication channel after a time period.*

*53. The non-transitory computer-readable medium of claim 51, wherein the setup confirm frame comprises an indication to the access point that the wireless device is entering a power-saving mode.*

*54. The non-transitory computer-readable medium of claim 51, further comprising instructions to:*

*instructions to control returning to the first communication channel after a time period; and*

*instructions to control receiving buffered data from the access point.*

*55. The non-transitory computer-readable medium of claim 51, further comprising:*

*instructions to control scanning the third communication channel;*

*instructions to determine an amount of traffic on the third communication channel; and instructions to suspend use of the third communication channel by the wireless device and the other wireless device based upon the amount of traffic on the third communication channel.*

*56. The non-transitory computer-readable medium of claim 55, further comprising instructions to control transmitting a channel switch request based upon the amount of traffic on the third communication channel, wherein the channel switch request comprises a proposed fourth communication channel.*

* * * * *